United States Patent
Wang et al.

(10) Patent No.: US 9,262,676 B2
(45) Date of Patent: Feb. 16, 2016

(54) HANDWRITTEN SIGNATURE DETECTION, VALIDATION, AND CONFIRMATION

(71) Applicants: Jerry Wang, Shanghai (CN); Haifeng Gong, Shanghai (CN); Hua Yang, Shanghai (CN)

(72) Inventors: Jerry Wang, Shanghai (CN); Haifeng Gong, Shanghai (CN); Hua Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 13/977,023

(22) PCT Filed: Sep. 28, 2012

(86) PCT No.: PCT/CN2012/082301
§ 371 (c)(1),
(2) Date: Jun. 28, 2013

(87) PCT Pub. No.: WO2014/047871
PCT Pub. Date: Apr. 3, 2014

(65) Prior Publication Data
US 2015/0078665 A1 Mar. 19, 2015

(51) Int. Cl.
*G06K 9/00* (2006.01)
*G06F 21/32* (2013.01)
*G06F 21/44* (2013.01)
*G06F 21/64* (2013.01)

(52) U.S. Cl.
CPC ............ *G06K 9/00402* (2013.01); *G06F 21/32* (2013.01); *G06F 21/44* (2013.01); *G06F 21/645* (2013.01); *G06F 2221/2111* (2013.01); *G06F 2221/2115* (2013.01)

(58) Field of Classification Search
CPC ..... G06K 9/00402; G06F 21/32; G06F 21/44; G06F 21/645; G06F 2221/2111
See application file for complete search history.

(56) References Cited

U.S. PATENT DOCUMENTS

| 7,607,018 | B2 * | 10/2009 | Baxter et al. ................... 713/176 |
| 2004/0064415 | A1 * | 4/2004 | Abdallah ............. G06Q 50/265 |
| | | | 705/50 |
| 2011/0053559 | A1 * | 3/2011 | Klein ..................... G07C 13/00 |
| | | | 455/411 |
| 2015/0078665 | A1 * | 3/2015 | Wang et al. ................... 382/187 |

FOREIGN PATENT DOCUMENTS

| CN | 1277400 A | 12/2000 |
| CN | 1763685 A | 4/2006 |
| WO | 2012/003570 A2 | 1/2012 |

OTHER PUBLICATIONS

International Search Report and Written Opinion received for PCT application No. PCT/CN2012/082301, mailed on Jul. 11, 2013, 11 pages.

* cited by examiner

*Primary Examiner* — Gregory M Desire
(74) *Attorney, Agent, or Firm* — Jordan IP Law, LLC

(57) ABSTRACT

Technologies may provide for detecting, validating, or confirming the validity of a handwritten signature. A logic architecture may be employed to detect a digital handwritten signature and validation data associated with a signature event, and to send the signature and the validation data to a trusted server. The logic architecture may validate the digital handwritten signature based on the signature and the validation data. Additionally, the logic architecture may present the digital handwritten signature with a reference to confirm the validity of the signature. The reference may be associated with identifying information corresponding to the event to confirm the validity of the signature.

28 Claims, 5 Drawing Sheets

HANDWRITTEN SIGNATURE DETECTION, VALIDATION, AND CONFIRMATION

BACKGROUND

Embodiments generally relate to the detection, the validation, or the confirmation of a handwritten signature. More particularly, embodiments relate to confirming a digital handwritten signature and validation data associated with a signature event.

A handwritten signature may be used to prove the identity and manifest the intent of a user (e.g., a signor). The incorporation of a handwritten signature into an electronic document may require the user to sign a paper version of the document and digitize the signed document. In addition, the handwritten signature may be scanned, copied and then pasted into the document. Therefore, there may be unnecessary processor and time utilization, as well as unnecessary power consumption.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1:
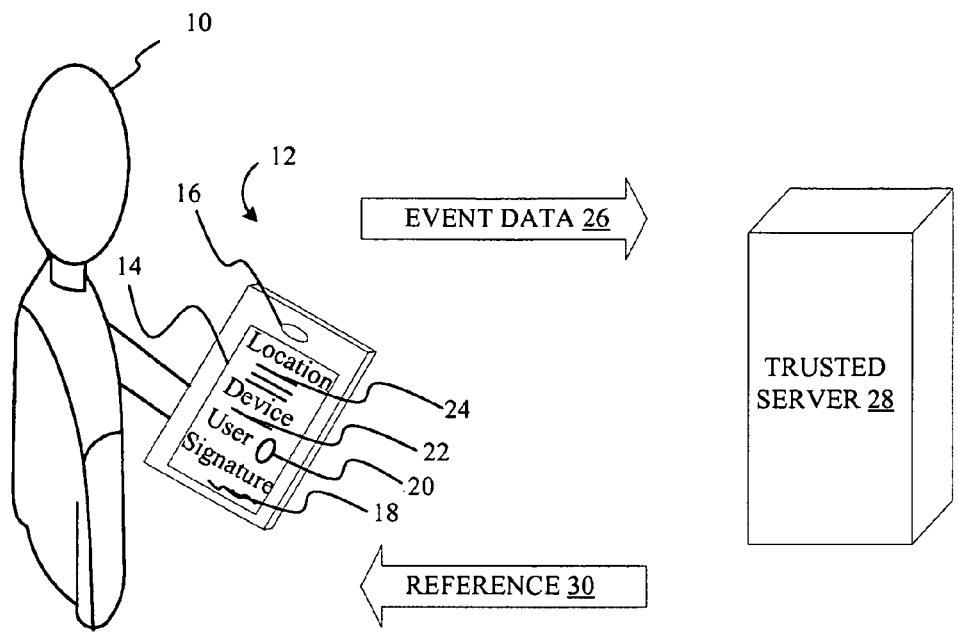
FIG. 1 is an example of an approach to validate a handwritten signature according to an embodiment.

FIG. 1 shows an approach to validate a handwritten signature. In the illustrated example, an apparatus 12 includes a screen 14 and a front-facing camera 16. The apparatus 12 may include any display platform such as a laptop, personal digital assistant (PDA), wireless smart phone, media content player, imaging device, mobile Internet device (MID), any smart device such as a smart phone, smart tablet, smart TV, an electronic writing pad, and so on, or combinations thereof. In one embodiment, the screen 14 of the apparatus 12 includes a touch screen.

The user 10 may initiate a signature event by handwriting a signature 18 directly on the screen 14. The illustrated apparatus 12 detects the handwritten signature 18 from the signature event, and detects validation data associated with the signature event. The validation data may include user data 20 for the user 10, such as image data for the user 10. For example, the front-facing camera 16 may capture the user data 20, such as facial image data of the user 20. In addition, the validation data may include device data 22 for the apparatus 12, such as an identity number of the apparatus 12. For example, memory or storage of the apparatus 12 may provide an international mobile equipment identity (IMEI) number of the apparatus 12. Moreover, the validation data may include location data 24 for the event, such as a geographic location where the user 10 handwrote the signature 18. For example, a location sensor of the apparatus 12 may supply the position that the user handwrote the signature 18 using a global positioning system (GPS).

Event data 26, including the signature and the validation data, is passed to a trusted server 28 to validate the signature 18 based on the validation data and based on the signature 18. The trusted server 28 may include a database to validate the signature 18. For example, the database may include an identity number database, such that the identity number of apparatus 12 included in the device data 22 may be validated against identity number information in the identity number database. In addition, the database may include a location database, such that the actual location of the apparatus 12 (e.g., when the user handwrote the signature 18) that is included in location data 24 may be validated against location information in the location database.

In one embodiment, the trusted server 28 may validate the signature 18 based on a biometric evaluation. For example, the database may include an image database, such that an image of the user 10 included in the image data 20 captured by the front-facing camera 16 may be validated against image data in the image database. In addition, the database may include a signature database, such that the signature 18 may be validated against signature data (e.g., an image of a valid signature of the user 10) in the database. When the signature 18 is validated, the data used to perform the validation may be stored at, or by, the trusted server 28.

The trusted server 28 may generate a reference 30 representative of the validity of the signature 18. For example, the reference 30 may include a confirmation number. The reference 30 may also include a uniform resource locator, a quick response code, a bar code, or combinations thereof. In one embodiment, the uniform resource locator may be associated with identifying information corresponding to the signature event to confirm the validity of the signature 18, the quick response code may be associated with identifying information corresponding to the signature event to confirm the validity of the signature 18, and so on, or there may be combinations thereof. In addition, the trusted server 28 may store the reference 30, may forward the reference 30 to the apparatus 12, or combinations thereof.

The reference 30 may be presented on the screen 14 with the signature 18. For example, the reference 30 may be presented on the screen 14 with the signature 18 as a hidden uniform resource locator. In one embodiment, the uniform resource locator may be used to examine or confirm the validity of the signature. In addition, the reference 30 and the signature 18 may be inserted into a document to confirm the validity or intent of the signature 18, or to provide a process to examine the validity of the signature. In one embodiment, the validity of the signature 18 may be examined by selecting the reference 30 and obtaining identifying information corresponding to the signature event in the apparatus 12, for example via an internet web page.

Figure 2:
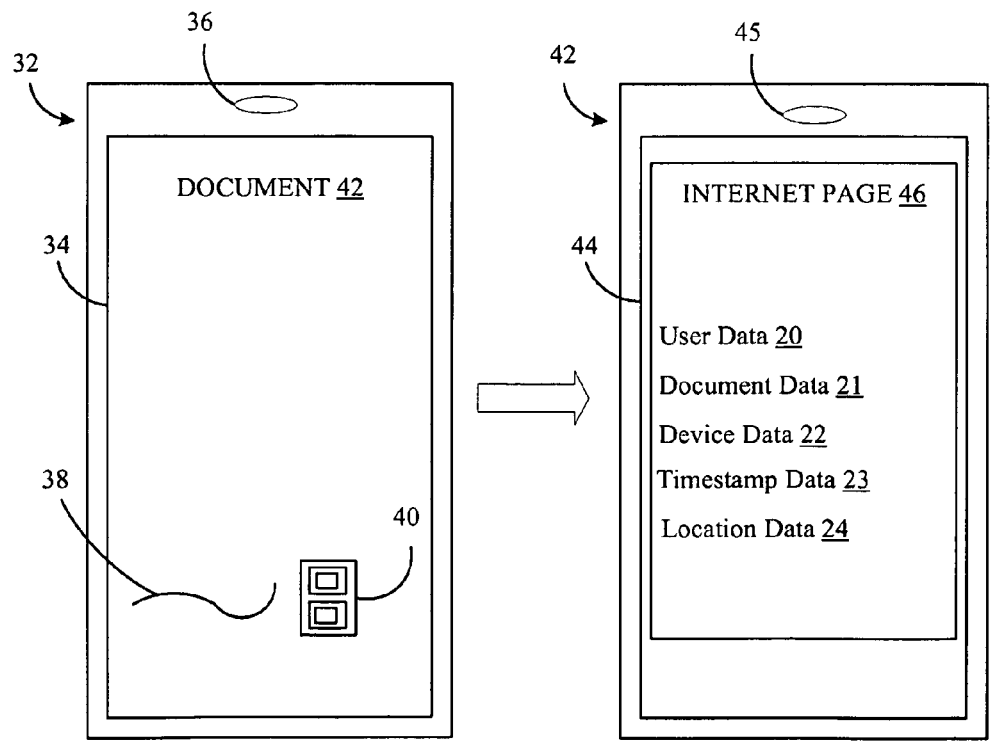
FIG. 2 is a screenshot of a an example to confirm or examine the validity a handwritten signature according to an embodiment.

Turning now to FIG. 2, a screenshot of an example of a scheme to confirm or examine the validity a handwritten signature 38 from a signature event is shown. In the illustrated screenshot, an apparatus 32 includes a screen 34 and a front-facing camera 36. The signature 38 is presented with a reference 40 that is in the form of a quick response code. The signature 38 and the reference 40 may have been inserted into a document 42 to validate the signature 38, to confirm the intent of a user (e.g., intent of a signor to associate the signature 38 with the document 42), to confirm the intent of the signature (e.g., the intent of a signor to be bound to the information in the document 42 with the signature 38), and so on, or combinations thereof. When the reference 40 (e.g., a quick response code) is selected, for example scanned using a front-facing camera 45 of a device 44, an Internet page 46 is presented including identifying information corresponding to the signature event. In one embodiment, the internet page 46 includes the user data 20, document data 21, the device data 22, timestamp data 23, and the location data 24.

When the signature 38 is validated at a trusted server, it is presented with the reference 40 and therefore carries a presumption of validity. The validity of the signature 38 may be confirmed or examined with identifying information. For example, an individual may confirm that the user (e.g., the signor) was reasonably responsible for the signature 38 at the time indicated by timestamp data 23 (i.e., the user would have been awake at the time of the signature 38, an establishment would have been open at the time the signature 38 was made, and so on). Similarly, the identifying information may be used to determine if the user (e.g., signor) was reasonably responsible for the signature 38 at a location indicated by the location data 24, if the device indicated by device data 22 is reasonable, if the document indicated by document data 21 is reasonable, if the user identified by user data 20 is reasonable, and so on, or combinations thereof.

Figure 3:
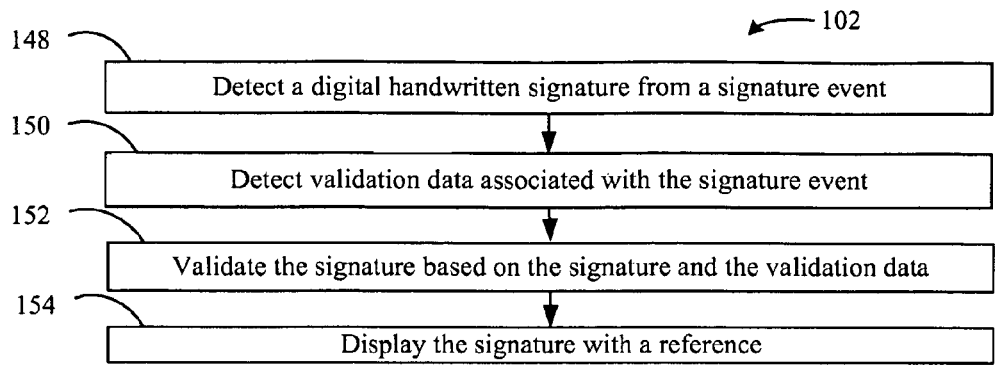
FIG. 3 is a block diagram of an example of a method to detect a handwritten signature and validation data, and to validate the handwritten signature according to an embodiment.

FIG. 3 shows a method 102 to obtain a handwritten signature and validation data, and to validate the handwritten signature based on the validation data and the signature. The method 102 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. The computer-readable storage medium may include a non-transitory computer-readable storage medium. Computer program code to carry out operations shown in the method 102 may be written in any combination of one or more programming languages, including an object oriented programming language such as C++ or the like and conventional procedural programming languages, such as the "C" programming language or similar programming languages. Moreover, the method 102 could be implemented using any of the aforementioned circuit technologies.

Illustrated processing block 148 provides for detecting a digital handwritten signature from a signature event. The signature may be detected using any platform, such as a laptop, PDA, wireless smart phone, media content player, imaging device, MID, any smart device such as a smart phone, smart tablet, smart TV, an electronic writing pad, and so on, or combinations thereof. In addition, the signature may be detected using a sensor connected to the platform, such as an image capture device (e.g., camera), a touch screen, and so on, or combinations thereof. The detection may be accomplished at any stage or component of an image pipeline, including a sensor, network interface component, memory, storage, hard disk, operating system, application, and so on, or combinations thereof. For example, a touch sensor (e.g., a touch screen) may detect the signature. The signature event may be initiated when the user handwrites the signature using the platform. The signature event may also be initiated, or may include, storing or retrieving the handwritten signature from any stage or component of the image pipeline.

Illustrated processing block 150 provides for detecting validation data associated with the signature event. The validation data may include user data for the user, such as image data for the user. For example, the image data for the user may include a feature of the user, an image of the user, or combinations thereof. The features may be determined by using any process, such as the scale invariant feature transform (SIFT), the compressed histogram of gradients (CHoG) descriptor, and so on, or combinations thereof. In addition, the image data may include an image of the user, a frame of a video of the user, and so on, or combinations thereof. The image data may include any format, such as joint photographic experts group format (JPEG) format, graphics interchange format (GIF), tagged image file format (TIFF), raw image file format (RAW), moving picture experts group format (MPEG), windows media video format (WMV) format, and so on, or combinations thereof. An image capture device (e.g., a camera) may be used to detect the feature, the image, the video, and so on, or combinations thereof.

The validation data may also include device data for signature, such as an identity number for the platform employed to provide the signature. For example, an identity number may include an international mobile equipment identification (IMEI) number, a media access control (MAC) address, an interne protocol (IP) address, and so on, or combinations thereof. The identity number may be provided from storage, from memory, from a sensor used to capture the data (e.g., a packet analyzer), and so on, or combinations thereof. In addition, the validation data may include location data for the event, such as a geographic location where the user handwrites the signature. For example, a location sensor may supply the geographic location where the signature is made using global positioning system (GPS), global system for mobile communications (GSM), and so on, or combinations thereof. Temporal data, such as a timestamp of when the signature is made, may be acquired from a temporal sensor (e.g., clock). Document data, for example the title of a document signed, may be acquired by searching and extracting keywords from the document, searching and extracting section breaks from the document, and so on, or combinations thereof.

Illustrated processing block 152 provides for validating the signature based on the validation data and on the signature. In one embodiment, the signature and the validation data may be communicated to a trusted server to validate the signature. For example, the trusted server may include a database of authorized devices (e.g., identity number database). When the signature from the signature event is made, the identity number of the device is provided in the device data and may be validated against the identity number information in the database. In addition, the database may include a database of authorized locations (e.g., location database). When the signature from the signature event is made, the actual location of the device used to make the signature is provided in the location data and may be validated against the location information in the database. Similarly, any other database associated with any other validation data may be provided, such as a temporal database, document database, and so on, or combinations thereof.

In one embodiment, the trusted server may validate the signature based on a biometric evaluation. For example, the database may include a database of image data (e.g., image database). When the signature from the signature event is made, the image data of the user making the signature is provided in the image data and may be validated against the image data in the database. In addition, the database may include a database of signature data (e.g. signature database). When the signature from the signature event is made, the signature itself may be validated against the signature data in the signature database. The data used to perform the validation may be stored. For example, if the image data, the location data, the device data, and the signature were used to validate the signature, all of this information may be stored at a trusted server, at another server such as an interne server, and so on, or combinations thereof.

A pair-wise comparison between the identity number of the device in the device data and identity numbers stored in the identity number database may be implemented. In addition, a pair-wise comparison between the actual location of the device used to make the signature and the entries of known or possible locations stored in the location database may be implemented. Moreover, a pair-wise comparison may be implemented between the timestamp of when the signature was made and entries of known or possible times that the signature may be reasonable. Also a pair-wise comparison may be implemented between a datestamp of when the signature was made and entries of known or possible dates that the signature may be reasonable. In addition, a pair-wise comparison between document data, determined for example from the document title, and known or possible documents used by the user may be implemented using a document database.

A pair-wise feature-matching process may match the signature or the user data, such as an image of the user, against an image in the image database (e.g., image of the user, image of the signature, and so on). The process may include performing a pair-wise comparison on a short list of candidates most likely to match the image of the user or the signature. Indexing of a feature may include any process, such as using approximate nearest neighbor search of SIFT descriptors with a best-bin-first strategy, a BoF model using a BoF codebook constructed by a K-means clustering of a training set of descriptors, using a codebook constructed including a hierarchical k-means clustering to create a vocabulary tree (VT), using a locally-sensitive hashing process, using any other tree-based processes, and so on, or combinations thereof. A genomic verification process may also be used. The process may include a regression process such as random sample consensus, checks based on feature-orientation information, re-ranking before the regression process, and so on, or combinations thereof. A match process (e.g., pair-wise comparison) may result in a confidence level value representative of the individual match quality, the overall match quality, or combinations thereof. For example, a range between 0% and 100% confidence level may be determined to validate the signature, based on the confidence level value of the match of any, or of combinations, of the validation data, the signature, and so on.

A reference may be generated that is representative of the validity of the signature. For example, the reference may include a confirmation number, a uniform resource locator, a quick response code, a bar code, and so on, or combinations thereof. In addition, the uniform resource locator may be associated with identifying information corresponding to the signature event to confirm the validity of the signature, the quick response code may be associated with identifying information corresponding to the signature event to confirm the validity of the signature, and so on, or there may be combinations thereof. In one embodiment, a trusted server may generate the reference and forward the reference to the device that was used to make the signature, to the device that is presenting the signature, to the device that includes an inserted signature in an electronic document, and so on, or combinations thereof.

Illustrated processing block 154 provides for displaying the signature with the reference. The reference may be presented by any platform, including a laptop, personal digital assistant (PDA), wireless smart phone, media content player, imaging device, mobile Internet device (MID), any smart device such as a smart phone, smart tablet, smart TV, an electronic writing pad, and so on, or combinations thereof. For example, the reference may be presented with the signature in the form of a hidden uniform resource locator, in the form of a quick response code, in the form of a barcode, and so on, or combinations thereof. In one embodiment, the reference may be used to examine or confirm the validity of the signature, to confirm the intent of the user, the intent of the signature, and so on, or combinations thereof. For example, the reference may be selected to provide identifying information corresponding to the signature event, such as the location where the signature was made, the time that signature was made, the day that the signature was made, the identity number of the device used to make the signature, the image of the signor captured when the signature was made, the name of the person making the signature, and so on, or combinations thereof. Moreover, the user may provide the handwritten signature directly on a display, may handwrite the signature on an electronic document using a touch screen or electronic writing pad, may insert the signature into the electronic document, and so on, and combinations thereof. Accordingly, the signature may be displayed, and if validated, may be displayed with the reference.

When the signature with the reference is validated, it may carry a presumption of validity. The validity, however, may be confirmed or examined via the identifying information since an individual may confirm that the user (e.g., the signor) was reasonably responsible for the signature at the location where the signature was made, at the time that signature was made, on the day that the signature was made, and so on, or combinations thereof. Moreover, the identifying information may confirm that the device having the identity number is reasonable under the circumstances, that the image of the signor captured when the signature was made is reasonable under the circumstances, that the name of the person making the signature is reasonable under the circumstances, that the appearance of the signature made is reasonable under the circumstances, and so on, or combinations thereof. A determination may be made by cursory examination of the identifying information itself, or may be made by evaluating a confidence level for any, or for each, of the components of the identifying information. The selection of the reference may result in the identifying information being presented in the form of an internet web page, for example from the trusted server, an internet server, and so on, or combinations thereof.

The method 102 may also provide for communicating a payload, such as the signature, the validation data, the reference, the identifying data, an association, and so on, or combinations thereof. The payload may be communicated to a remote processor, a remote apparatus, a remote system, or combinations thereof. For example, the signature and the validation data may be forwarded from the device used to detect the signature to a remote trusted server, the reference may be forwarded from a trusted server to a remote device, the identifying information may be forwarded from an internet server to a remote device used to present the signature with the reference, and so on, or combinations thereof. A network interface component may provide communication functionality for a wide variety of purposes, such as cellular telephone (e.g., LTE, W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning Systems (GPS), spread spectrum (e.g., 900 MHz), and other radio frequency (RF) telephony purposes. In addition, the payload may be stored or used in a local or remote processor, apparatus, system, or combinations thereof.

The communication of the payload may also include securely sending or receiving the payload, such as the signature, the validation data, the reference, the identifying data, the association, and so on, or combinations thereof. For example, the communication may include using a secure credential or channel to authenticate the payload, prior or in addition to generating, sending, using, validating, associating, confirming, or examining an aspect of the payload. Any encryption process may be used to securely communicate the payload, including the Rivest Shamir Adleman (RSA) algorithm, secure hash algorithm (SHA), message-digest algorithm (MD5), Internet protocol security (IPSec), secure socket layer (SSL), Secure Shell (SSH) protocol, and so on, or combinations thereof.

Figure 4:
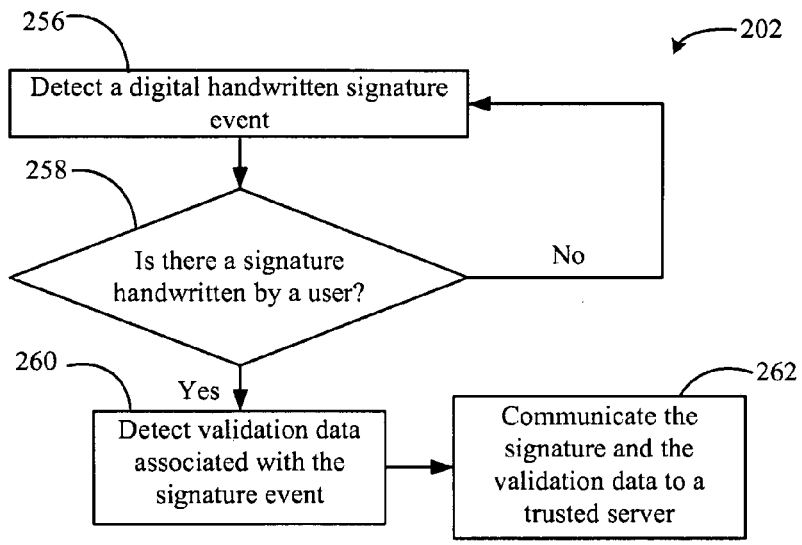
FIG. 4 is a flowchart of an example of a method to detect a handwritten signature and validation data according to an embodiment.

Turning now to FIG. 4, an example of a method to detect a handwritten signature and to detect validation data is shown. The method 202 could be implemented using any of the herein mentioned technologies. The illustrated processing block 256 detects a digital handwritten signature event. A determination may be made at block 258 if the signature is handwritten. For example, a digital handwritten signature event may include a user making a digital handwritten signature on a touch screen. If not, the detection of the handwritten signature event may be made at a later time, for example at a predetermined time after the detection of the handwritten signature, the detection of a new handwritten signature, and so on, or combinations thereof. In one embodiment, the user may be prompted for the handwritten signature. If the signature is handwritten, validation data associated with the signature event is detected at processing block 260. For example, image data may be detected, location data may be detected, device data may be detected, temporal data may be detected, date data may be detected, document data may be detected, and so on, or combinations thereof. The signature and the validation data are communicated to a trusted server at processing block 262, such that the trusted server may validate the handwritten signature. The method 202 could optionally include any of the herein mentioned processes. For example, the method 202 may optionally include receiving a reference from the trusted server, displaying the reference on a device display with the signature, and so on, or combinations thereof.

Figure 5:
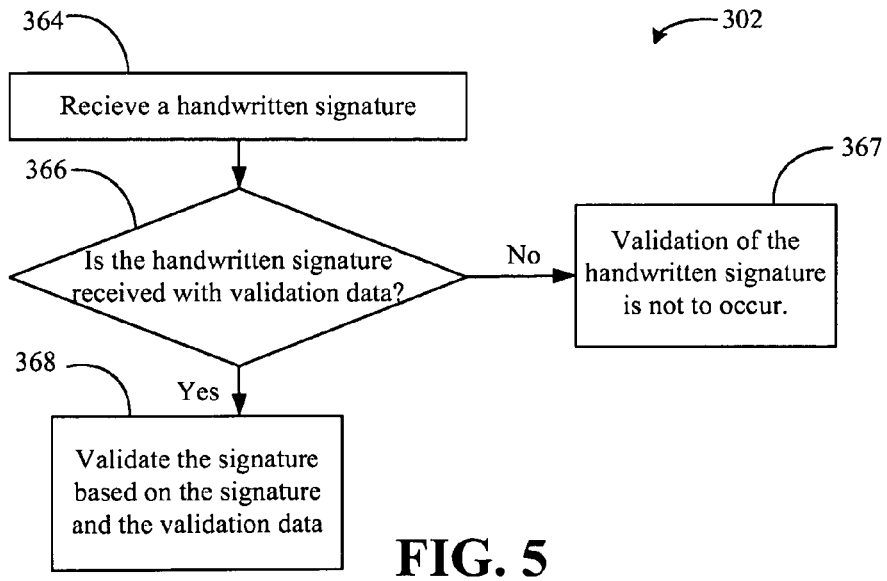
FIG. 5 is a flowchart of an example of a method to validate a handwritten signature according to an embodiment.

FIG. 5 shows an example of a method to validate a handwritten signature. The method 302 could be implemented using any of the herein mentioned technologies. The method 302 could be implemented at a trusted server. The illustrated processing block 364 receives the handwritten signature. A determination is made at block 366 if the handwritten signature is received with validation data. For example, a determination may be made if image data is received, location data is received, device data is received, temporal data is received, date data is received, document data is received, and so on, or combinations thereof. If not, processing block 367 determines that the validation of the handwritten signature is not to occur. There may be a presumption of invalidity of the signature when the validation of the handwritten signature does not occur. For example, this circumstance may yield a confidence level of 0%, which may be provided to a user seeking to confirm or examine the validity of the signature. In addition, the omission of a reference with the signature may indicate the presumption of invalidity of the signature.

If the handwritten signature is received with the validation data, processing block 368 validates the signature based on the validation data and the signature. For example, the validation may be based on a biometric evaluation of the signature associated with the signature event, on a biometric evaluation of the image data associated with the signature event, and so on, or combinations thereof. Moreover, the validation may occur using a portion of the validation data received. For example, if image data, location data, device data, temporal data, date data, document data, etc. are received at the trusted server, only a portion (e.g., only the image data) may be used to validate the signature. When the signature is valid, a reference may be generated and sent to a remote device, for example to be presented with the signature. In one embodiment, the reference may include a confidence level value representative of strength of validity, match quality, and so on, or combinations thereof. In addition, the reference may be associated with identifying information corresponding to the signature event to confirm the validity of the signature.

Figure 6:
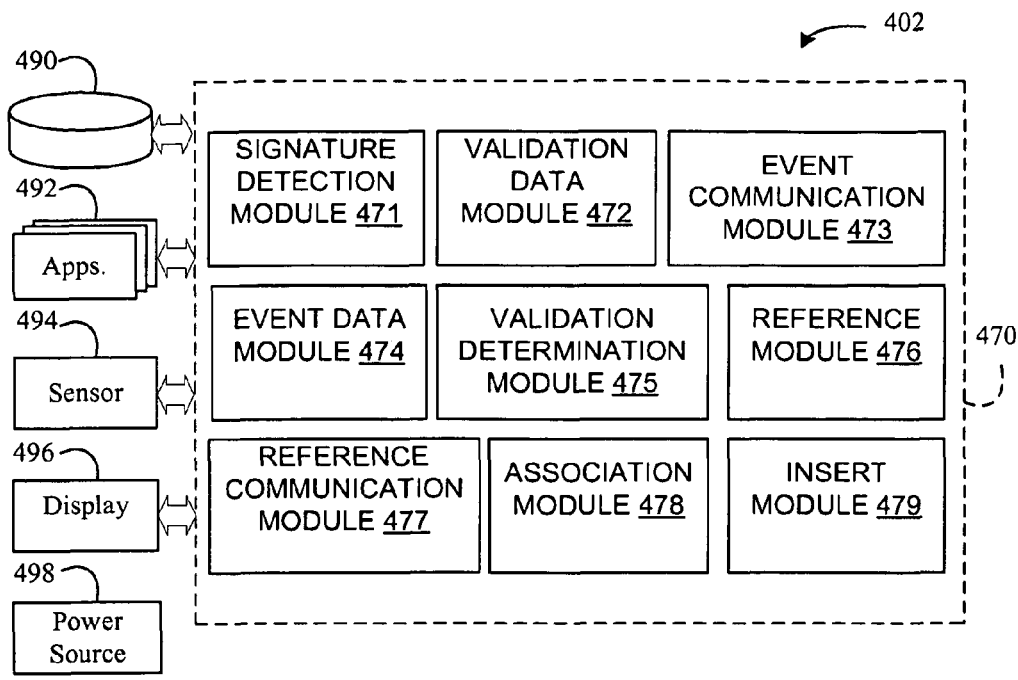
FIG. 6 is a block diagram of an example of a logic architecture according to an embodiment.

Turning now to FIG. 6 an apparatus 402 includes a logic architecture 470 to detect a digital handwritten signature from a signature event and validation data associated with the signature event, and to validate the signature based on the signature and the validation data. The logic architecture 470 may be generally incorporated into a platform such as such as a laptop, PDA, wireless smart phone, media player, imaging device, mobile Internet device (MID), any smart device such as a smart phone, smart tablet, smart TV, an electronic writing pad, and so on, or combinations thereof. The logic architecture 470 may be implemented in an application, operating system, media framework, hardware component, or combinations thereof. The logic architecture 470 may be implemented in any component of the image pipeline, such as a network interface component, memory, processor, hard drive, operating system, application, and so on, or combinations thereof. For example, the logic architecture 470 may be implemented in a processor, such as central processing unit (CPU), a graphical processing unit (GPU), a visual processing unit (VPU), a sensor, an operating system, an application, and so on, or combinations thereof. The apparatus 402 may include a power source 498, such as a battery, a power connector, and so on, or combinations thereof.

In the illustrated example, the logic architecture 470 includes a signature detection module 471 to detect the digital handwritten signature from the signature event. For example, the signature detection module 471 may receive data from applications 492 to detect the signature, from a sensor 494 to detect the signature, from a display 496 to detect the signature, and so on, or combinations thereof. In addition, the logic architecture 470 includes a validation data module 472 to detect validation data associated with the signature event. In one embodiment, the validation data module 472 may detect location data for the signature event, image data for a user, device data for the signature, or combinations thereof. For example, the validation module 472 may receive the location data, the image data, or the device data from storage 490, from the applications 492, from the sensor 494, from the display 496, and so on, or combinations thereof.

In the illustrated example, the logic architecture 470 includes an event communication module 473 to communicate the signature and the validation data to a remote processor, a remote device, a remote system, and so on, or combinations thereof. In one embodiment, the event communication module 473 may forward the signature and the validation data to a trusted server. For example, the event communication module 473 may forward the location data for the signature event, the image data for the user, the device data for the signature, and the signature to a trusted server. The event communication module 473 may employ a secure process to communicate the signature and the validation data.

In the illustrated example, the logic architecture 470 includes an event data module 474 to receive the signature and the validation data associated with the signature event. In one embodiment, the event data module 474 may receive the signature and the validation data directly from the signature detection module 471 and the validation module 472, respectively, from the event communication module 473, or there may be combinations thereof. The illustrated logic architecture 470 also includes a validation determination module 475 to validate the signature based on the signature and the validation data. The validation determination module 475 may validate the signature based on the location data for the event, the image data for the user, the device data for the signature, and so on, or combinations thereof.

In addition, the validation determination module 475 may validate the signature based on a geographic location of the event, a feature of the user, an image of the user, an identity number of a device, the signature, and so on, or combinations thereof. Moreover, the validation determination module 475 may validate the signature based on a biometric evaluation of image data, the signature, and so on, or combinations thereof. The validation determination module 475 may receive the signature and the validation data directly from the signature detection module 471 and the validation module 472, respectively, from the event communication module 473, from the event data module 474, or there may be combinations thereof.

In the illustrated example, the logic architecture 470 includes a reference module 476 to generate a reference representative of the validity of the signature. In one embodiment, the reference may include a confirmation number, a uniform resource locator, a quick response code, a bar code, or combinations thereof. The reference may be associated with identifying information corresponding to the signature event to confirm the validity of the signature. The reference module 476 may also integrate a confidence level value with the reference. The confidence level value may be generated by, or from, the validation determination module 475 and may indicate of the strength of validity of the signature, the match quality of the signature and validation data used, and so on, or combinations thereof.

In the illustrated example, the logic architecture 470 also includes a reference communication module 477, for example to communicate the reference or the confidence value to/from a remote processor, apparatus, system, or combinations thereof. In one embodiment, a trusted server may generate the reference and forward the reference to the device that is used to make the signature, to a device that is used to present the signature, to a device that includes an electronic document with the signature inserted therein, and so on, or combinations thereof. The reference communication module 477 may employ a secure process to communicate the reference, the confidence level value, and so on, or combinations thereof.

In the illustrated example, the logic architecture 470 includes an association module 478 to associate the reference with the signature. For example, the association module 478 may relate the signature with the reference. In one embodiment, the association module 478 may provide the relation between the signature and the reference when the signature is used, when the signature is made, when the signature is inserted, and so on, or combinations thereof. The association module 478 may receive the signature directly from the signature detection module 471, or from the event communication module 473, and may receive the reference directly from the reference module 478, or from the reference communication module 479, or there may be combinations thereof.

In the illustrated example, the logic architecture 470 may also include an insert module 479 to insert the signature with the reference. For example, the insert module 479 may insert the signature with the reference, based on the association provided by the association module 478, into a document presented on the display 496, the applications 492, and so on, or combinations thereof. The insert module 479 may receive the signature directly from the signature detection module 471, or from the event communication module 473, and may receive the reference directly from the reference module 478, or from the reference communication module 479, or there may be combinations thereof. The apparatus 402 may use the storage 490 to store the signature, the validation data, the reference, the confidence level value, the association, and any other data used in the signature pipeline. While examples have illustrated separate modules, it is apparent that one or more of the modules of the logic architecture 470 may be implemented in one or more combined modules.

Figure 7:
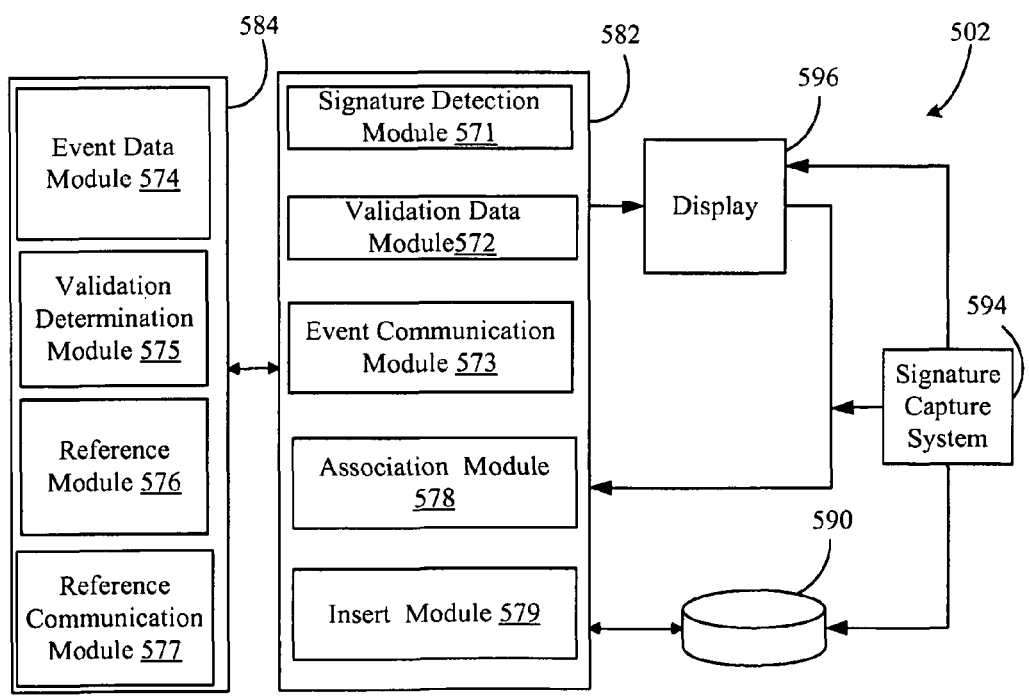
FIG. 7 is a block diagram of an example of a system to detect a handwritten signature and validation data, and to validate the handwritten signature according to an embodiment.

FIG. 7 shows a block diagram of an example of a system 502 to detect, validate or confirm a handwritten signature. The system 502 may include a logic architecture 582 and a logic architecture 584 in combinations with other system components, such as a display 596 to present the signature together with a reference, a signature capture system 594 to provide a signature to the system 502, system memory (not shown), mass storage (not shown), network interface component (not shown), and so on, or combinations thereof. In addition, the system 502 may include dedicated components to receive or process an image, such as a dedicated graphic component including dedicated graphics memory (not shown).

In the illustrated example, the logic architecture 582 includes a signature detection module 571 to detect the digital handwritten signature from the signature event. For example, the signature detection module 571 may receive sensor data from the display 596, from the signature capture system 594, from the storage 590, and so on, or combinations thereof. The logic architecture 582 also includes a validation data module 572 to detect the validation data associated with the signature event. For example, the validation data may be determined from an image capture device (e.g., camera) connected with the display 596. The logic architecture 582 also includes an event communication module 573, to communicate the signature and the validation data to the system 584. In one embodiment, the logic architecture 582 includes a signature platform (e.g., a mobile device), and system 584 includes a trusted server.

In the illustrated example, the logic architecture 584 includes an event data module 574 to receive the digital handwritten signature and the validation data associated with a signature event from the logic architecture 582. The logic architecture 584 includes a validation determination module 575 to validate the signature based on the signature and the validation data. The validation determination module 575 may validate the signature based on the location data for the event, the image data for the user, the device data for the signature, and so on, or combinations thereof. In addition, the validation determination module 575 may validate the signature based on a geographic location of the event, a feature of the user, an image of the user, an identity number of a device, the signature, and so on, or combinations thereof. Moreover, the validation determination module 575 may validate the signature based on a biometric evaluation of image data, the signature, and so on, or combinations thereof.

In the illustrated example, the logic architecture 584 includes a reference module 576 to generate a reference representative of the validity of the signature. In one embodiment, the reference may include a confirmation number, a uniform resource locator, a quick response code, a bar code, or combinations thereof. The reference may be associated with identifying information corresponding to the signature event to confirm the validity of the signature. The reference module 576 may also integrate a confidence level value with the reference, which may be generated by, or from, the validation determination module 575. The logic architecture 584 also includes a reference communication module 577, for example to communicate the reference or the confidence value to the logic architecture 582.

In the illustrated example, the logic architecture 582 includes an association module 578 to associate the reference with the signature. For example, the association module 578 may relate the signature with the reference to confirm the validity of the signature, the intent of the signor, the intent of the signature, and so on, or combinations thereof. In one embodiment, the association module 578 may provide the relation between the signature and the reference when the signature is used, when the signature is made, and so on, or combinations thereof. The association module 578 may receive the signature directly from the signature detection module 571 and may receive the reference from the reference module 576 via the reference communication module 577.

In the illustrated example, the logic architecture 582 may also include an insert module 579 to insert the signature with the reference and confirm the validity of the signature. For example, the insert module 579 may insert the signature with the reference, based on the association provided by the association module 578, into a document presented on the display 596. The insert module 579 may receive the signature directly from the signature detection module 571 and may receive the reference from the reference module 576 via the reference communication module 577. The system 502 may use the storage 590 to store the signature, the validation data, the reference, the confidence level value, the association, and any other data in the signature detection, validation or confirmation pipeline.

Figure 8:
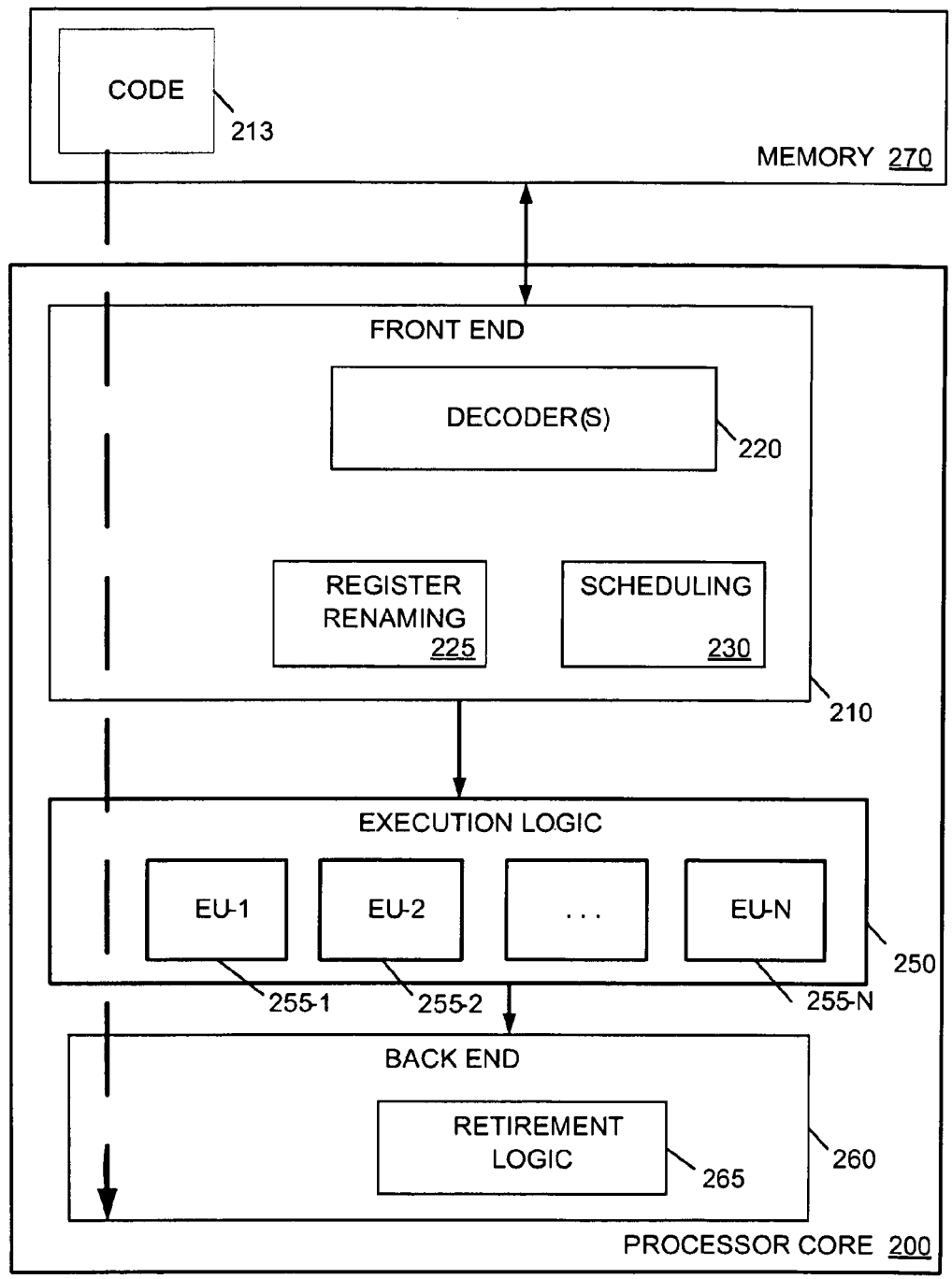
FIG. 8 is a block diagram of an example of a processor according to an embodiment.

FIG. 8 illustrates a processor core 200 according to one embodiment. The processor core 200 may be the core for any type of processor, such as, a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 470 (FIG. 6), the logic 582 (FIG. 7), or the logic 584 (FIG. 7) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor. 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
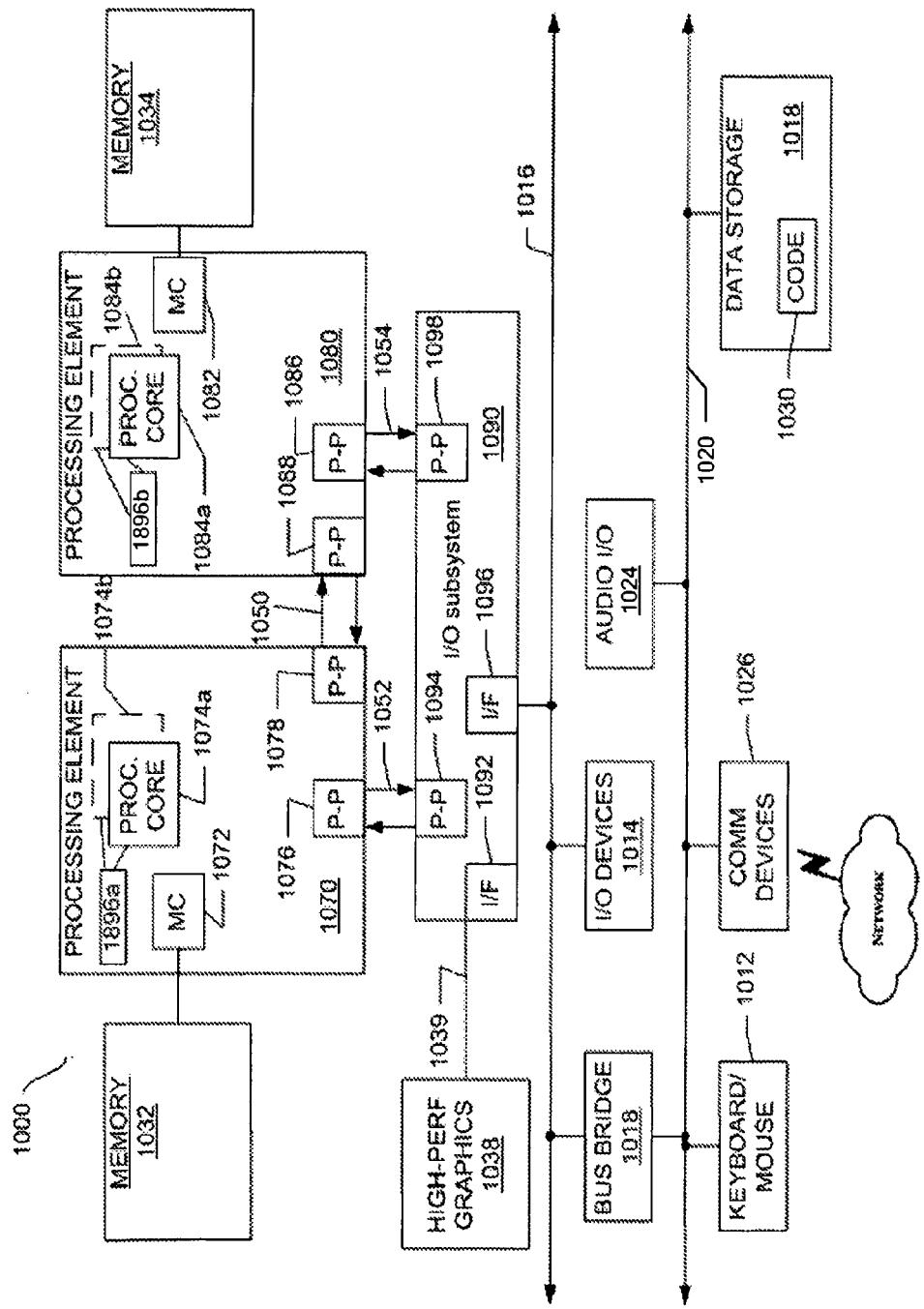
FIG. 9 is a block diagram of an example of a system according to an embodiment.

Referring now to FIG. 9, shown is a block diagram of a system embodiment 1000 in accordance with an embodiment. Shown in FIG. 9 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 8.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope of the present embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present embodiments are not so limited.

As shown in FIG. 9, various I/O devices 1014 such as the screen 14 (FIG. 1), the screen 34 (FIG. 2), the screen 44 (FIG. 2), the display 496 (FIG. 6) or the display 596 (FIG. 7) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 470 (FIG. 6), the architecture logic architecture 582 (FIG. 7), or the logic architecture 584 (FIG. 7), and could be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Embodiments may include a computer-implemented method in which a digital handwritten signature, from a signature event, may be detected. The computer-implemented method may also include detecting validation data associated with the signature event. The validation data may include location data for the event, such as a geographic location of the event. The validation data may include image data for the user, such as a feature of the user, an image of the user, or combinations thereof. The validation data may include device data for the signature, such as an identity number of a device.

The computer-implemented method may also include communicating the digital handwritten signature and the validation data with a trusted server. The computer-implemented method may communicate image data, location data, device data, and the signature, or combinations thereof, to the trusted server. The computer-implemented method may also include receiving a reference representative of the validity of the signature from the trusted server and associating the signature with the reference. The reference may include a uniform resource locator, a quick response code, or combinations thereof. The uniform resource locator may, be associated with identifying information corresponding to the signature event to confirm the validity of the signature, the quick response code may be associated with identifying information corresponding to the signature event to confirm the validity of the signature, or there may be combinations thereof. The computer-implemented method may include inserting the signature and the reference into a document to confirm the validity of the signature. The computer-implemented method may include presenting the signature and the reference to confirm the validity of the signature.

Embodiments may also include a computer-implemented method in which a digital handwritten signature and validation data associated with a signature event may be received. The computer-implemented method may include validating the signature based on the signature and the validation data. The validation of the signature may include using location data for the event, image data for the user, device data for the signature, the signature itself, or combinations thereof. The validation of the signature may include using a geographic location of the event, a feature of the user, an image of the user, an identity number of a device, the signature, or combinations thereof. The validation of the signature may be based on a biometric evaluation of the image data, the signature, or combinations thereof. The computer-implemented method may generate a reference representative of the validity of the signature. The computer-implemented method may also include communicating the reference to a remote processor. The computer-implemented method may store the signature, the validation data, the reference, information corresponding to the event, or combinations thereof.

Embodiments may include a computer-readable storage medium having a set of instructions, which, if executed by a processor, may cause a processor to detect a digital handwritten signature from a signature event. The instructions, if executed, may cause a processor to detect validation data associated with the signature event. The instructions, if executed, may cause a processor to communicate the digital handwritten signature and the validation data to a trusted server. The instruction, if executed, may cause a processor to communicate image data, location data, device data, the signature, or combinations thereof, to the trusted server.

The instructions, if executed, may cause a processor to receive a reference representative of the validity of the signature from the trusted server and associate the signature with the reference. The instructions, if executed, may cause a processor to insert the signature and the reference into a document to confirm the validity of the signature. The instructions, if executed, may cause a processor to present the signature and the reference to confirm the validity of the signature.

Embodiments may also include a computer-readable storage medium having a set of instructions, which, if executed by a processor, may cause a processor to receive a digital handwritten signature and validation data associated with a signature event. The instructions, if executed, may cause a processor to validate the signature based on the signature and the validation data. The instructions, if executed, may cause a processor to validate the signature based on location data for the event, image data for the user, device data for the signature, the signature itself, or combinations thereof.

The instructions, if executed, may cause a processor to validate the signature based on a geographic location of the event, a feature of the user, an image of the user, an identity number of a device, the signature, or combinations thereof. The instructions, if executed, may cause a processor to validate the signature based on a biometric evaluation of one or more of image data, the signature, or combinations thereof. The instruction, if executed, may cause a processor to generate a reference representative of the validity of the signature. The instructions, if executed, may cause a processor to communicate the reference to a remote processor. The instructions, if executed, may cause a processor to store the signature, the validation data, and the reference, identifying information corresponding to the event, or combinations thereof Embodiments may include a system having logic to detect a digital handwritten signature. The logic may include a signature detection module to detect a digital handwritten signature from a signature event. The system may include logic to detect validation data. The logic may include a validation data module to detect validation data associated with the signature event. The validation data module may detect location data for the event, image data for a user, device data for the signature, or combinations thereof.

The system may include logic to communicate the signature and the validation data. The logic may include an event communication module to communicate the signature and the validation data to a trusted server. The system may include logic to receive and associate the signature with a reference representative of the validity of the signature. The logic may include an association module to receive the reference from the trusted server and associate the signature with the reference. The system may include logic to insert the signature and the reference to confirm the validity of the signature. The logic may include an insert module to insert the signature and the reference, for example in a document.

The system may also include logic in combination with one or more system components, such as a power supply, a user interface, image capture system, system memory, network interface component, and so on, or combinations thereof. In addition, the system may include one or more sensors, such as a camera. Moreover, the system may include a display to present the signature and the reference to confirm the validity of the signature.

Embodiments may also include a system having logic to receive a digital handwritten, signature and validation data. The logic may include an event data module to receive a digital handwritten signature and validation data associated with a signature event. The system may include logic to validate the signature. The logic may include a validation determination module to validate the signature based on the signature and the validation data. The validation determination module may validate the signature based on location data for the event, image data for a user, device data for the signature, or combinations thereof. The validation determination module may validate the signature based on a geographic location of the event, a feature of the user, an image of the user, an identity number of a device, the signature, or combinations thereof. The validation determination module may validate the signature based on a biometric evaluation of image data, the signature, or combinations thereof.

The system may include logic to generate a reference representative of the validity of the signature. The system may also include logic to communicate the reference. The logic may include a reference communication module to forward the reference to a remote system. The system may also include logic in combination with one or more system components, such as a power supply, a display, a user interface, image capture system, system memory, network interface component, and so on, or combinations thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (APT), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a hardware element;
a signature detection module to detect a digital handwritten signature from a signature event;
a validation data module to detect validation data associated with the signature event, wherein the validation data is to include two or more of location data for the event, image data for a user, and device data for the signature; and
an event communication module to communicate the signature and the validation data to a trusted server, wherein the hardware element is to implement one or more of the signature detection module, the validation data module, and the event communication module.

2. The system of claim 1, wherein the location data is to include a geographic location of the event, the image data is to include one or more of a feature of the user and an image of the user, and the device data is to include an identity number of a device.

3. The system of claim 1, further including an association module to receive a reference representative of the validity of the signature from the trusted server and associate the signature with the reference to display the signature together with the reference to confirm the validity of the signature.

4. The system of claim 3, further including an insert module to insert the signature and the reference into a document to display the signature together with the reference in the document to confirm the validity of the signature.

5. The system of claim 3, further including a display device to display the signature together with the reference to confirm the validity of the signature.

6. The system of claim 3, wherein the reference is to include one or more of a uniform resource locator and a quick response code, and wherein the uniform resource locator and the quick response code are to be associated with identifying information corresponding to the event to confirm the validity of the signature.

7. The system of claim 3, wherein the reference is to be inserted in a document that is to be displayed and one or more of selectable from the document and hidden from view absent a selection from the document, and wherein the reference is to display identifying information corresponding to the event to confirm the validity of the signature when selected.

8. The system of claim 7, wherein the identifying information is to be displayed in a web page when a uniform resource locator in the document is to be selected, and wherein the identifying information is to be displayed in a web page when a quick response code in the document is to be scanned.

9. A non-transitory computer-readable medium comprising one or more instructions that when executed on a processor cause the processor to:
   detect a digital handwritten signature from a signature event;
   detect validation data associated with the signature event, wherein the validation data is to include two or more of location data for the event, image data for a user, and device data for the signature, and
   communicate the digital handwritten signature and the validation data to a trusted server.

10. The medium of claim 9, wherein the location data is to include a geographic location of the event, the image data is to include one or more of a feature of the user and an image of the user, and the device data is to include an identity number of a device.

11. The medium of claim 9, wherein when executed the one or more instructions configure a processor to communicate the image data, the location data, the device data, and the signature to the trusted server.

12. The medium of claim 9, wherein when executed the one or more instructions configure a processor to receive a reference representative of the validity of the signature from the trusted server and associate the signature with the reference to display the signature together with the reference to confirm the validity of the signature.

13. The medium of claim 12, wherein the reference is to include one or more of a uniform resource locator and a quick response code.

14. The medium of claim 13, wherein one or more of the uniform resource locator and the quick response code are to be associated with identifying information corresponding to the event to confirm the validity of the signature.

15. A system comprising:
   a hardware element;
   an event data module to receive a digital handwritten signature and validation data associated with a signature event; and
   a validation determination module to validate the signature based on the signature and the validation data, wherein the validation data is to include two or more of location data for the event, image data for a user, and device data for the signature, and wherein the hardware element is to implement one or more of the event data module and the validation determination module.

16. The system of claim 15, wherein the validation determination module is to validate the signature based on a biometric evaluation of one or more of the image data and the signature.

17. The system of claim 15, further including a reference module to generate a reference representative of the validity of the signature to be displayed together with the signature to confirm the validity of the signature.

18. The system of claim 17, further including a reference communication module to forward the reference to a remote system to be inserted into a document together with the signature and displayed to confirm the validity of the signature.

19. The system of claim 17, wherein the reference is to include one or more of a uniform resource locator and a quick response code.

20. The system of claim 17, further including storage to store one or more of the signature, the validation data, and the reference.

21. The system of claim 17, wherein the reference is to be inserted in a document that is to be displayed and one or more of selectable from the document and hidden from view absent a selection from the document, and wherein the reference is to display identifying information corresponding to the event to confirm the validity of the signature when selected.

22. A non-transitory computer-readable medium comprising one or more instructions that when executed on a processor cause the processor to:
   receive a digital handwritten signature and validation data associated with a signature event; and
   validate the signature based on the signature and the validation data, wherein the validation data is to include two or more of location data for the event, image data for a user, and device data for the signature.

23. The medium of claim 22, wherein the location data is to include a geographic location of the event, the image data is to include one or more of a feature of the user and an image of the user, and the device data is to include an identity number of a device.

24. The medium of claim 22, wherein when executed the one or more instructions configure a processor to validate the signature based on a biometric evaluation of one or more of the image data and the signature.

25. The medium of claim 22, wherein when executed the one or more instructions configure a processor to generate a reference representative of the validity of the signature to be displayed together with the signature to confirm the validity of the signature.

26. The medium of claim 25, wherein when executed the one or more instructions configure a processor to communicate the reference to a remote processor to be inserted into a document together with the signature and displayed to confirm the validity of the signature.

27. The medium of claim 25, wherein the reference is to include one or more of a uniform resource locator and a quick response code.

28. The medium of claim 25, wherein when executed the one or more instructions configure a processor to store one or more of the signature, the validation data, and the reference.

* * * * *